(12) United States Patent
Shindo et al.

(10) Patent No.: US 8,559,070 B2
(45) Date of Patent: Oct. 15, 2013

(54) APPARATUS AND METHOD OF IMAGE PROCESSING, AND RECORDING MEDIUM STORING IMAGE PROCESSING CONTROL PROGRAM

(75) Inventors: Hidenori Shindo, Tokyo (JP); Yuuta Saitoh, Kanagawa (JP); Hiroyuki Katoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 125 days.

(21) Appl. No.: 13/312,444

(22) Filed: Dec. 6, 2011

(65) Prior Publication Data

US 2012/0147440 A1 Jun. 14, 2012

(30) Foreign Application Priority Data

Dec. 10, 2010 (JP) ................................. 2010-275294

(51) Int. Cl.
*H04N 1/04* (2006.01)
(52) U.S. Cl.
USPC ........ 358/474; 358/1.15; 358/1.16; 358/1.13; 715/769
(58) Field of Classification Search
USPC .............. 358/474, 1.15, 1.13, 1.16, 488, 448, 358/442, 403; 715/769, 837, 845
See application file for complete search history.

(56) References Cited

U.S. PATENT DOCUMENTS

| | | | | |
|---|---|---|---|---|
| 5,867,612 A * | 2/1999 | Robson | ........................... | 382/298 |
| 6,799,223 B1 * | 9/2004 | Yamamoto | .................... | 709/250 |
| 7,171,612 B2 * | 1/2007 | Toda | .............................. | 715/201 |
| 7,301,653 B2 | 11/2007 | Shindoh | | |
| 7,515,293 B2 | 4/2009 | Kizaki et al. | | |
| 7,676,764 B2 * | 3/2010 | Nakajima | ...................... | 715/846 |
| 7,782,473 B2 | 8/2010 | Kizaki et al. | | |
| 7,924,444 B2 * | 4/2011 | Takahashi | .................... | 358/1.13 |
| 8,390,833 B2 * | 3/2013 | Takahashi | .................... | 358/1.13 |
| 8,422,054 B2 * | 4/2013 | Masuyama | ................... | 358/1.15 |
| 2004/0109186 A1 | 6/2004 | Shindoh et al. | | |
| 2004/0136022 A1 | 7/2004 | Kizaki et al. | | |
| 2004/0233466 A1 | 11/2004 | Shindoh et al. | | |
| 2005/0157322 A1 | 7/2005 | Kizaki et al. | | |
| 2006/0132821 A1 * | 6/2006 | Nonaka et al. | ................ | 358/1.13 |
| 2008/0278754 A1 * | 11/2008 | Hibino | .......................... | 358/1.15 |

FOREIGN PATENT DOCUMENTS

JP 2008073895 A 4/2008

* cited by examiner

*Primary Examiner* — Negussie Worku
(74) *Attorney, Agent, or Firm* — Harness, Dickey & Pierce, P.L.C.

(57) ABSTRACT

As described above, the image processing apparatus scans an original document into scanned image data, and converts the scanned image data into converted image data having a data format that is suitable for a first process requested by a first processing request. In prior to receiving a subsequent processing request that follows the first processing request, the image processing apparatus generates converted image data from the scanned image data, which has a data format other than the data format of the converted image data generated for the first process, and stores the converted image data in a storage device. After the first process is executed, the image processing apparatus obtains the converted image data having a data format that is suitable for a subsequent process requested by a subsequent processing request, from the storage device, to perform the subsequent process.

15 Claims, 7 Drawing Sheets

FIG. 3

```
START
  ↓
OBTAIN SCANNED IMAGE DATA FROM SECONDARY
STORAGE TO SEQUENTIALLY GENERATE CONVERTED   — S301
IMAGE DATA
  ↓
STORE CONVERTED IMAGE DATA IN SECONDARY      — S302
STORAGE
  ↓
END
```

FIG. 4

| PROCESS TYPE | FORMAT BEFORE CONVERSION | FORMAT AFTER CONVERSION |
|---|---|---|
| COPY | RGB, EACH COLOR 8bit | CMYK 2bit (ENCODED FORMAT A) |
| | | CMYK 2bit (ENCODED FORMAT B) |
| FAX TRANSMISSION | RGB, EACH COLOR 8bit | CMYK 1bit (MH ENCODED) |
| | | CMYK 1bit (MR ENCODED) |
| | | CMYK 1bit (MMR ENCODED) |
| | | CMYK 1bit (JBIG ENCODED) |
| DISTRIBUTION | RGB, EACH COLOR 8bit | CMYK 1bit (UNENCODED) |
| | | CMYK 1bit (MH ENCODED) |
| | | CMYK 1bit (MR ENCODED) |
| | | CMYK 1bit (MMR ENCODED) |
| | | CMYK 1bit (JBIG ENCODED) |
| | | RGB 8bit (UNENCODED) |
| | | RGB 8bit (JPEG ENCODED) |
| | | RGB 8bit (JPEG2000 ENCODED) |
| | | RGB 8bit (CLEAR LIGHT PDF ENCODED) |
| | | RGB 8bit (SEARCHABLE PDF ENCODED) |

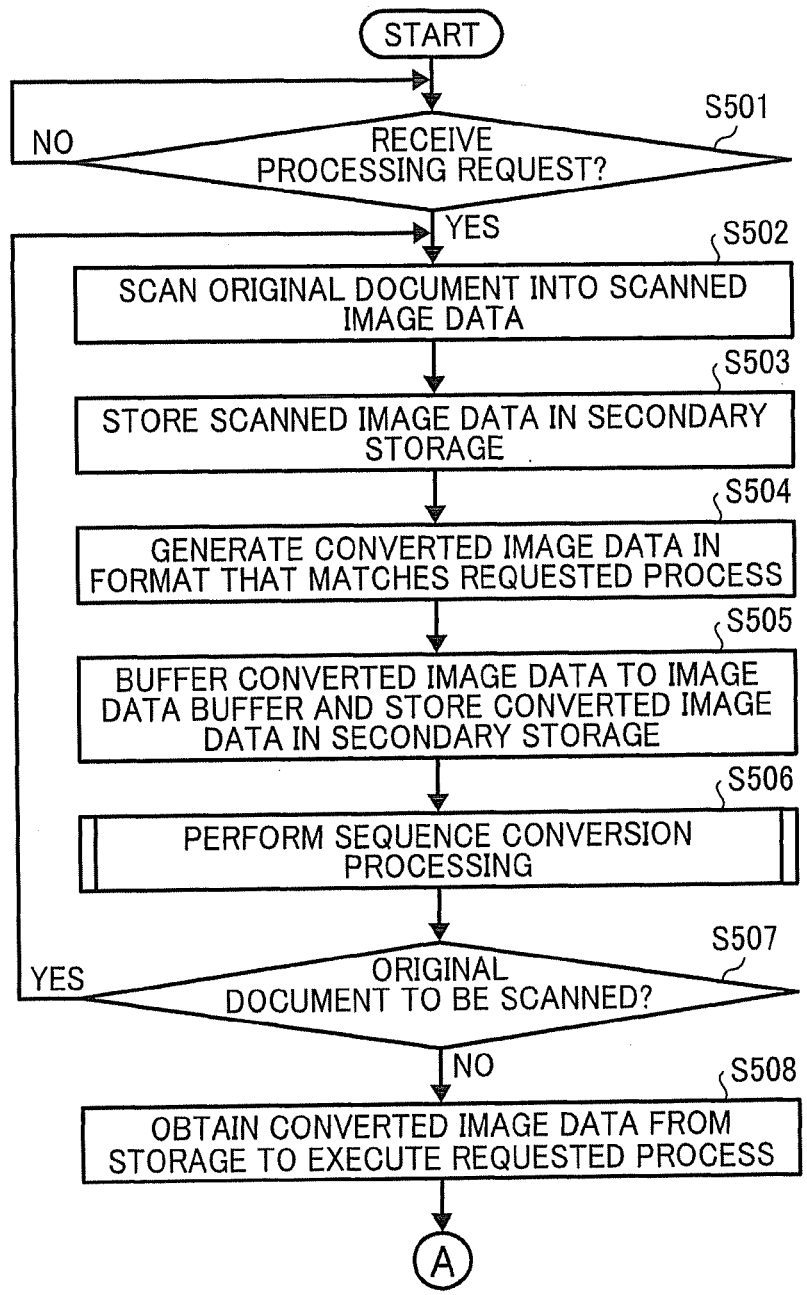

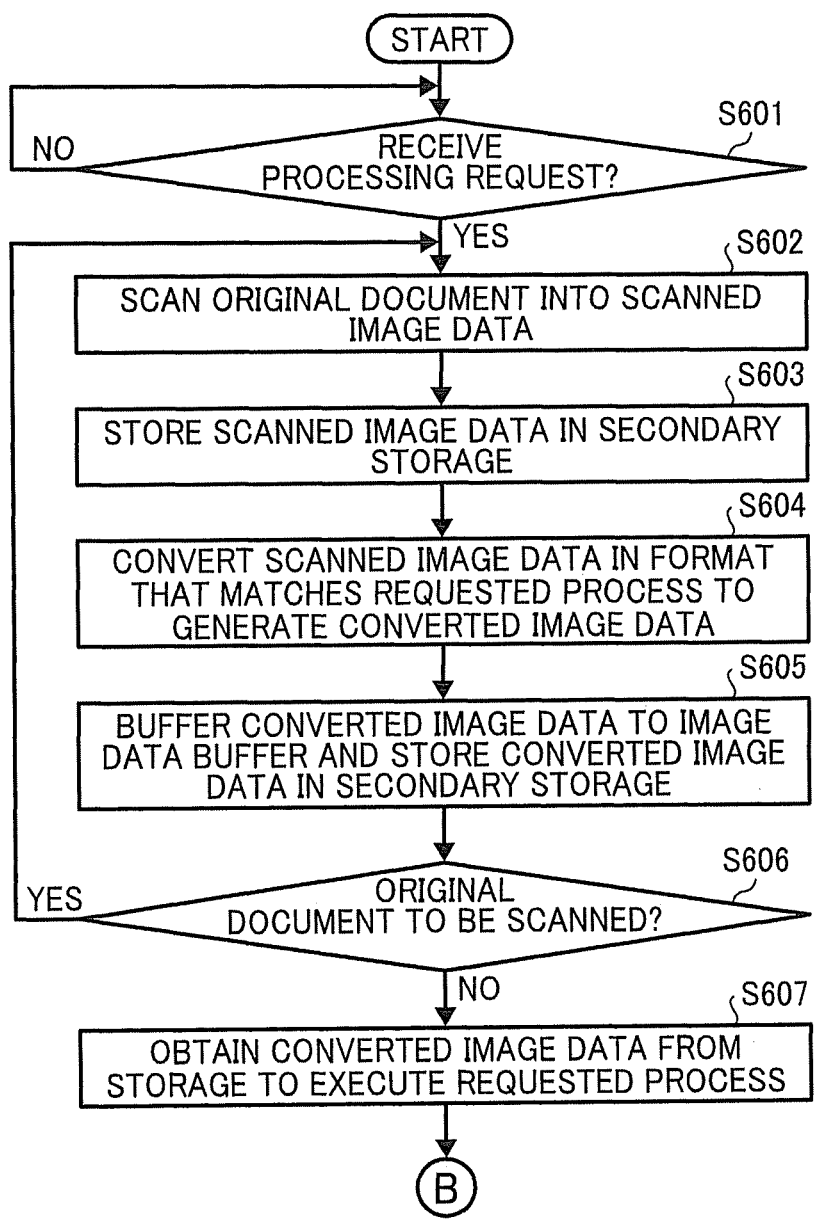

APPARATUS AND METHOD OF IMAGE PROCESSING, AND RECORDING MEDIUM STORING IMAGE PROCESSING CONTROL PROGRAM

CROSS-REFERENCE TO RELATED APPLICATIONS

This patent application is based on and claims priority pursuant to 35 U.S.C. §119 to Japanese Patent Application No. 2010-275294, filed on Dec. 10, 2010, in the Japan Patent Office, the entire disclosure of which is hereby incorporated herein by reference.

FIELD OF THE INVENTION

The present invention generally relates to an image processing apparatus, and more specifically relates to an apparatus and method of scanning an original document into scanned image data and converting a data format of the scanned image data and a recording medium storing an image processing control program.

BACKGROUND

The recent image processing apparatuses such as multi-functional products (MFP) are capable of performing various processing such as copying, printing, and transmitting image data through a network. In order to perform specific processing requested by a user, the image processing apparatuses scan an original document into scanned image data having a data format specific to the requested processing, and perform the requested processing or a subsequent processing that follows the requested processing using image data converted from the scanned image data having the specific data format. This technique of generating scanned image data having a data format specific to the requested processing tends to degrade quality of the converted image data that is used for performing the subsequent processing. Further, this tends to increase overall processing time required for data conversion, especially in case of processing the subsequent processing.

Japanese Patent Application Publication No. 2008-73895 describes an image processing apparatus, which scans an original document into scanned image data and stores the scanned image data in a memory. The image processing apparatus further converts the scanned image data to respectively generate image data for plotter output and image data for network distribution. For example, assuming that the scanned image data is to be output through a plotter and distributed through a network, the image processing apparatus converts the scanned image data to have a data format suitable for plotter output such as in CMYK, and outputs the converted image data through the plotter. The image processing apparatus further converts the scanned image data to have a data format suitable for network distribution such as in PDF, TIFF, or JPEG, and distributes the converted image data through the network.

While the above-described image processing apparatus may simplify a memory structure for sequentially processing various requests, it still requires the image processing apparatus to convert the scanned image data obtained from the memory to have a data format specific to each requested processing, thus increasing the processing time for executing the subsequent processing.

SUMMARY

One aspect of the present invention is to provide an image processing apparatus capable of sequentially performing a plurality of processing requests with improved efficiency. For example, when a first processing request is received, the image processing apparatus scans an original document into scanned image data and stores the scanned image data in a memory. The image processing apparatus converts the scanned image data into converted image data having a data format suitable for a first process requested by the first processing request. The image processing apparatus further converts the scanned image data into converted image data having a data format suitable for a process other than the first process to prepare for a subsequent process to be requested by a subsequent processing request that follows the first processing request. In performing the subsequent process requested by the subsequent processing request, the image processing apparatus obtains the converted image data that is previously prepared for the subsequent process such that the subsequent process can be performed with improved efficiency and reduced processing time.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a flowchart illustrating operation of converting scanned image data of an original document, performed by a converter of the image processing apparatus of FIG. 1;

FIG. 4 is an illustration for explaining data formats to which the converter of the image processing apparatus of FIG. 1 can convert;

FIG. 5, including FIGS. 5A and 5B are a flowchart illustrating operation of processing one or more processing requests, performed by the image processing apparatus of FIG. 1, according to an example embodiment of the present invention; and FIG. 6, including FIGS. 6A AND 6B, is a flowchart illustrating operation of processing one or more processing requests, performed by the image processing apparatus of FIG. 1, according to an example embodiment of the present invention.

Figure 1:
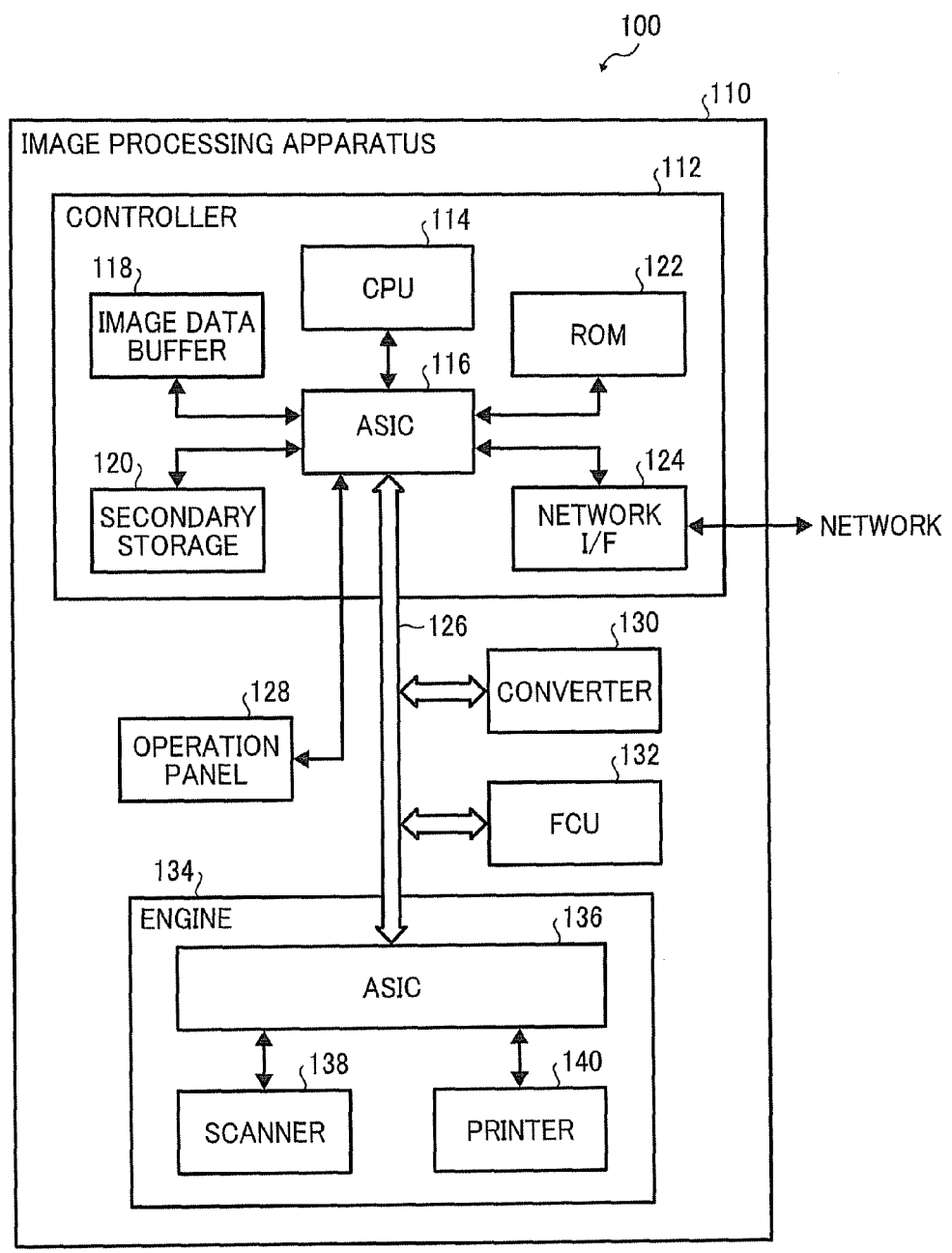
FIG. 1 is a schematic block diagram illustrating a hardware structure of an image processing apparatus according to an example embodiment of the present invention.

The accompanying drawings are intended to depict example embodiments of the present invention and should not be interpreted to limit the scope thereof. The accompanying drawings are not to be considered as drawings to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, a hardware structure 100 of the image processing apparatus 110 is explained according to an example embodiment of the present invention.

In this example, the image processing apparatus 110 is implemented by a MFP that is capable of performing various types of processing including, for example, scanning operation of scanning an original document into scanned image data; copying operation of printing the scanned image data onto a recording sheet to output a printed sheet; distribution operation of distributing image data through a network such as a local area network; and facsimile transmission operation of transmitting image data via facsimile. The image processing apparatus 110 includes a processor, a volatile memory such as a random access memory (RAM), and nonvolatile memory such as a hard disk drive (HDD) and ROM. Under control of an operating system (OS) such as UNIX or LINUX, the processor loads an image processing program from the HDD or ROM onto the RAM to cause the image processing apparatus 110 to perform image processing operation according to the image processing program. The image processing program may be written in any desired programming language such as assembler, C, C++, JAVA, Java, Script, etc.

The image processing apparatus 110 of FIG. 1 mainly includes a controller 112, an operation panel 128, a converter 130, a facsimile control unit (FCU) 132, and an engine 134.

The controller 112 controls entire processing performed by the image processing apparatus 110. The controller 112 includes a central processing unit (CPU) 114, an application specific integrated circuit (ASIC) 116, an image data buffer 118, a secondary storage 120, a read only memory (ROM) 122, and a network interface (I/F) 124.

The CPU 114 is a processor that controls processing performed by the image processing apparatus 110. For example, the CPU 114 deploys a control program such as the image processing program stored in the ROM 122 onto the RAM to perform various processing including the image processing operation that will be described below.

The ASIC 116 is an integrated circuit that performs scanning of the original document, distribution of image data, and printing of image data, for example. When the ASIC 116 receives a processing request that requests execution of various processing, which is instructed by a user through the operation panel 128, the ASIC 116 causes any one of the converter 130, FCU 132, and engine 134 to perform the requested processing, by transmitting a control signal through a peripheral component interconnect (PCI) bus 126. In this example, the ASIC 116 is assumed to perform various processing through at least one of the converter 130, FCU 132, and engine 134. Alternatively, the ASIC 116 may deploy specific programs onto the RAM to execute various processing according to the processing request.

The image data buffer 118 is a data buffer that temporarily stores image data to be processed. The image data buffer 118 may be implemented by a volatile memory such as RAM, for example. In this example, the image data that is generated by scanning the original document, which may be referred to as the scanned image data, is stored in the secondary storage 120 through the image data buffer 118. The scanned image data, which is read out from the secondary storage 120, is converted so as to have a specific format to generate converted image data. The converted image data, which is generated by the converter 130, is buffered into the image data buffer 118 and stored in the secondary storage 120, on a first-in first-out (FIFO) basis. The ASIC 116 performs various processing using the converted image data such as printing, facsimile transmission, or network distribution.

The secondary storage 120 is a storage device that stores the scanned image data and the converted image data. The secondary storage 120 may be alternatively referred to as a supplementary storage. When storing the scanned image data or the converted image data, the ASIC 116 generates identification information ("image data identification information") that is unique to the image data being stored, in the form of metadata that is associated with the image data being stored. The ASIC 116 uses this image data identification information to obtain, from the secondary storage 120, the scanned image data or the converted image data that matches the process requested by the processing request. In this example, the secondary storage 120 may be implemented by a nonvolatile memory such as a HDD or flash memory.

The network I/F 124 functions as an interface with the outside network such as a LAN network or the Internet. The network I/F 124 transmits the converted image data to the outside network according to an instruction received from the ASIC 116. The network I/F 124 may receive various data such as data to be printed from the outside network, for example, from an information processing apparatus that generates the data to be printed.

The operation panel 128 allows the user to select, from various processing that can be provided by the image processing apparatus 110, one or more processing to cause the image processing apparatus 110 to perform the selected processing. The operation panel 128 displays thereon processing that can be provided by the image processing apparatus 110. Upon selection of specific processing and settings information that further specifies how the selected processing is to be performed by the user, one or more processing requests each requesting execution of selected processing are transmitted to the ASIC 116 together with information regarding a type of the selected processing and settings information. In this example, the operation panel 128 is implemented by a touch panel screen.

More specifically, the operation panel 128 displays thereon a plurality of buttons or keys, which may be collectively referred to as keys. The keys include a key for instructing copying of the original document, a key for instructing facsimile transmission of image data of the original document, a key for instructing network distribution of image data of the original document, etc. When the key for copying is selected, the user is able to select or specify a number of pages to be copied, a color of the printed image being output, a recording sheet size, image quality of the printed image, encoding format of image data, enlarged size ratio, reduction size ratio, etc., as settings information for copying. When the key for facsimile transmission is selected, the user is able to select or specify a telephone number to which facsimile data is sent, image quality of facsimile data, encoding format of facsimile data, re-transmission option indicating whether to re-transmit in case of error, etc., as settings information for facsimile transmission. When the key for network distribution is selected, a file path or an email address that identifies a destination to which image data is sent, encoding format of image data, etc., as settings information for network distribution.

The operation panel 128 further requests the user to select whether to store image data being processed, when a plurality of processing requests are to be sequentially performed. In one example, the operation panel 128 may provide a check box that can be selected or unselected by the user. In another example, the operation panel 128 may be caused to display a message that asks the user whether to store image data, only when more than one processing requests are instructed.

In alternative to instructing processing to be performed through the operation panel 128, the user may instruct the image processing apparatus 110 to perform specific processing by sending one or more processing requests through the information processing apparatus via the network. In such case, the processing request received at the network I/F 124 is sent to the ASIC 116 for further processing.

For the descriptive purposes, in this example, any one of the operation panel 128 and the network interface 124 may be collectively referred to as a user interface that provides the function of receiving one or more processing requests from the user.

The converter 130 converts a data format of the scanned image data of the original document to generate converted image data having a data format that matches the requested processing, according to an instruction received from the ASIC 116. In this example, the converter 130 is implemented by an ASIC that is specially designed for data conversion. Alternatively, the functions of the converter 130 may be at least partially performed by a data conversion program. In this example illustrated in FIG. 1, the converter 130 is provided independently from the controller 112. Alternatively, the controller 112 may incorporate therein the converter 130. Examples of data format to which the scanned image data can be converted by the converter 130 will be described below referring to FIG. 4.

The FCU 132 transmits image data of the original document via facsimile. The FCU 132 transmits the converted image data that is generated by the converter 130 through a telephone network, according to an instruction received from the ASIC 116.

The engine 134 provides functions of scanning the original document or printing image data of the original document. The engine 134 includes an ASIC 136, scanner 138, and printer 140.

The ASIC 136 is an integrated circuit that performs various processing such as scanning of the original document or printing of image data of the original document. For example, according to an instruction received from the controller 112, the ASIC 136 causes the scanner 138 to scan the original document into scanned image data or causes the printer 140 to print the scanned image data on a recording sheet. Alternatively, any of the functions provided by the ASIC 136 may be performed by a control program that is deployed onto the RAM.

The scanner 138 scans the original document into scanned image data. The scanner 138, which is implemented by any desired scanner, includes an optical system and a charged coupled device (CCD) sensor, for example. According to an instruction for scanning that is received from the ASIC 136, the scanner 138 scans light toward the original document surface to form an optical image on the CCD sensor. The CCD sensor converts the optical image formed thereon to an electrical signal. The scanner 138 further applies image processing such as analog-to-digital conversion to the electrical signal to generate scanned image data. The scanned image data may be further applied with correction processing such as gamma correction. The scanner 138 outputs the scanned image data to the controller 112 through the PCI bus 126.

The printer 140 prints image data of the original document, which is obtained by converting the scanned image data, onto a recording sheet. According to an instruction received from the ASIC 136, the printer 140 prints the image data onto the recording sheet based on settings information included in the processing request input by the user through the operation panel 128. In case of copying, the printer 140 obtains the scanned image data generated by the scanner 138 and stored in the secondary storage 120, and prints the scanned image data onto the recording sheet. In case of printing, the printer 140 obtains image data to be printed from the network through network I/F 124, and prints the image data onto the recording sheet.

Figure 2:
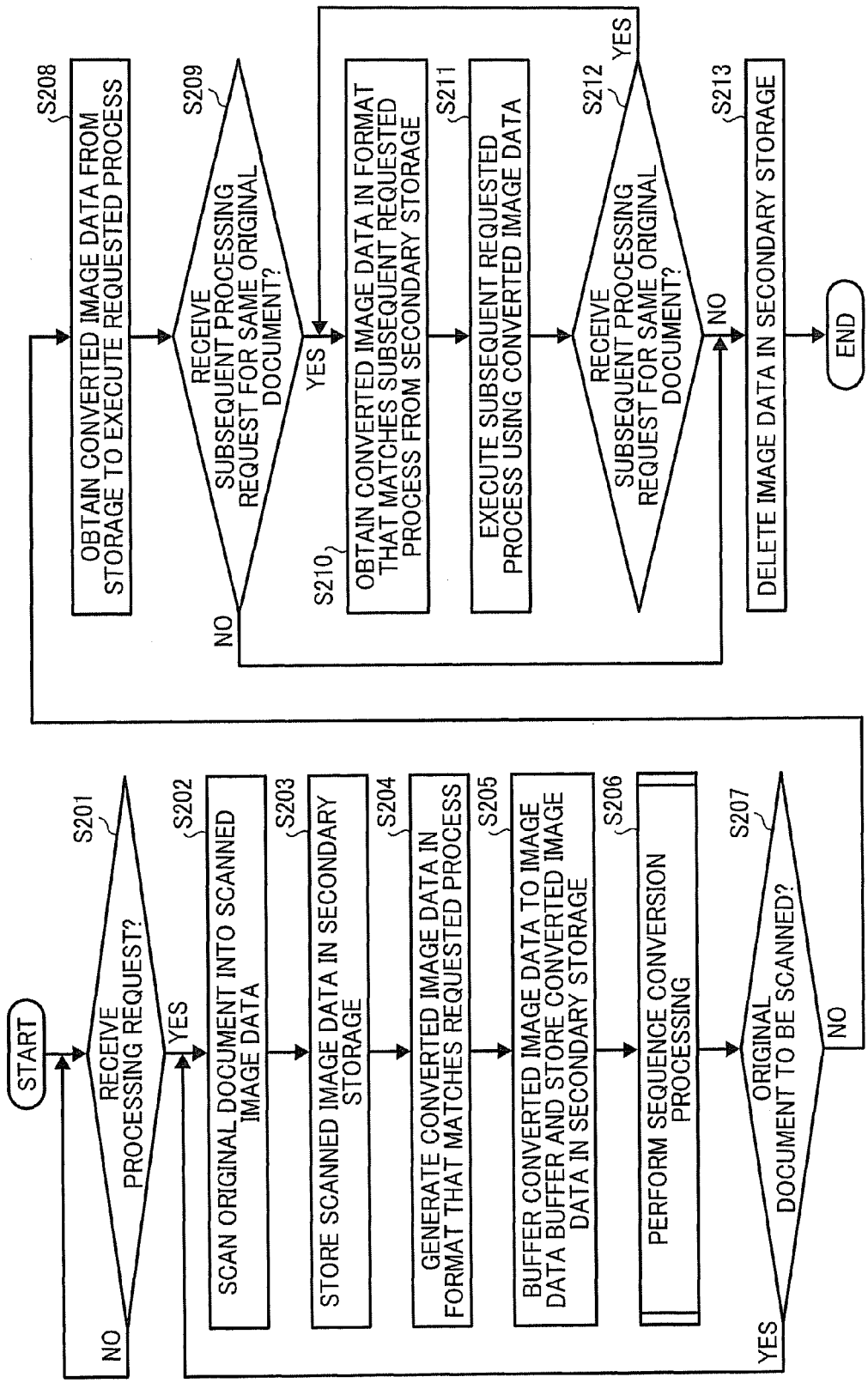
FIG. 2 is a flowchart illustrating operation of processing one or more processing requests, performed by the image processing apparatus of FIG. 1, according to an example embodiment of the present invention.

FIG. 2 is a flowchart illustrating operation of processing a plurality of requests requested by the user with respect to an original document, performed by the image processing apparatus 110 of FIG. 1. The operation of FIG. 2 is performed when the power of the image processing apparatus 110 is turned on. Further, in this example, it is assumed that the user at the image processing apparatus 110 places the original document onto a document feeder of an automatic document feeder (ADF) or an exposure glass of the image processing apparatus 110, before inputting an instruction to the image processing apparatus 110.

At S201, the ASIC 116 determines whether a processing request is received from the operation panel 128. When it is determined that the processing request is not received ("NO" at S201), the operation repeats S201. When it is determined that the processing request is received ("YES" at S201), the operation proceeds to S202.

At S202, the ASIC 116 transmits an instruction for scanning the original document to the engine 134. The ASIC 136 of the engine 134 causes the scanner 138 to scan the original document to generate scanned image data, and transmits the scanned image data to the ASIC 116. At S203, the ASIC 116 stores the scanned image data generated at S202 in the secondary storage 120, through the image data buffer 118.

In this example, the scanned image data is generated in a predetermined data format that is previously determined, which is common to different types of processing. For example, as described below referring to FIG. 4, the scanned image data is generated and stored as 8 bit RGB image data.

At S204, the ASIC 116 sends the scanned image data generated at S202 to the converter 130 to cause the converter 130 to convert the scanned image data into converted image data having a data format that matches the process requested by the processing request received at S201.

In this example, the converter 130 uses processing type information that is received together with the processing request to determine the process requested by the processing request. For example, assuming that copying, facsimile transmission, and network distribution can be selected, the processing type information specifies one of copying, facsimile transmission, and network distribution, which is selected by the user through the operation panel 128.

The converter 130 further determines a data format requested by the processing request, based on information regarding the encoding format of image data that is included in the processing request as the settings information. For example, as described above referring to FIG. 1, the user may select the encoding format of image data as settings information after selecting operation to be performed. When the processing request does not include such information regarding the encoding format, the converter 130 uses an encoding format that is set by default, which may be selected from encoding formats that are available for conversion by the converter 130.

For example, assuming that the process requested by the processing request is copying and the encoding format is "A"

encoding format, the converter 130 converts the scanned image data in 8 bit RGB to the converted image data in 2 bit CMYK, "A" encoded data. In another example, assuming that the process requested by the processing request is facsimile transmission and the encoding format is "MMR", the converter 130 converts the scanned image data in 8 bit RGB to the converted image data in 1 bit CMYK, MMR encoded data.

At S205, the ASIC 116 stores the converted image data generated by the converter 130 in the secondary storage 120 through the image data buffer 118. At S206, the ASIC 116 causes the converter 130 to apply sequential conversion processing to the scanned image data, as described below referring to FIG. 3. In this example, processing at S206 and processing at S207 are concurrently performed.

At S207, the ASIC 116 determines whether there is any original document to be scanned. When it is determined that there is an original document to be scanned ("YES" at S207), the operation returns to S202 to repeat S202 to S206. When there is no original document to be scanned ("NO" at S207), the operation proceeds to S208. In this example, when the scanner 138 of the engine 134 completes scanning of the original document, the scanner 138 determines whether an original document to be scanned is placed onto the document feeder of the ADF mounted on the image processing apparatus 110 or the exposure glass of the image processing apparatus 110, for example, using a sensor, to generate a determination result. The document feeder of the ADF can hold a plurality of original documents to be scanned. The determination result is notified to the ASIC 116. Based on this notification, the ASIC 116 determines whether there is an original document to be scanned.

At S208, the ASIC 116 obtains the converted image data from the secondary storage 120, and provides the converted image data to a function that is capable of executing the process requested by the processing request to perform the requested process. For example, assuming that the requested process of the processing request received at S201 is printing, the ASIC 116 obtains the converted image data having a data format that is suitable for printing, which is generated at S205, and sends the converted image data to the printer 140. Under control of the ASIC 116, the printer 140 prints the converted image data on a recording sheet to output a printed image.

At S209, the ASIC 116 determines whether a subsequent processing request is received for the same original document that has been processed at S208. When it is determined that the subsequent processing request is received ("YES" at S209), the operation proceeds to S210. When it is determined that the subsequent processing request is not received ("NO" at S209), the operation proceeds to S213.

In this example, when an instruction for storing the image data is received as settings information of the processing request received at S201, at S209, the ASIC 116 waits for the subsequent processing request. When the subsequent processing request is received, the operation proceeds to S210. If the subsequent processing request is not received at S209 even when a predetermined time period elapses, the operation ends. On the other hand, when the instruction for storing the image data is not received as settings information of the processing request received at S201, the ASIC 116 determines that there is no subsequent processing request, and the operation proceeds to S213.

At S210, the ASIC 116 obtains converted image data having a data format that matches the subsequent process that is requested at S209, from the secondary storage 120 that stores converted image data at S206. In this example, the ASIC 116 obtains the converted image data having a data format that matches the subsequent process, using the processing type information that is received with the subsequent processing request, information regarding the encoding format that is included in the subsequent processing request as settings information, and the image data identification information that is associated with the converted image data being stored in the secondary storage 120.

For example, assuming that the subsequent processing request instructs to distribute image data of the original document in color, the subsequent processing request includes processing type information that is "distribution" and the settings information indicating color. In such case, the ASIC 116 determines that the processing type information is "distribution", and the encoding format of image data is 8 bit RGB, JPEG encoded, based on the settings information. The ASIC 116 further searches the converted image data in 8 bit RGB, JPEG encoded format, using the image data identification information.

At S211, the ASIC 116 provides the converted image data obtained at S210 to a function that executes the process requested by the subsequent processing request to execute the requested process. For example, assuming that the subsequent process is network distribution, the ASIC 116 sends the converted image data, such as the converted image data in 8 bit RGB, JPEG encoded format, to the network I/F 124 to cause the network I/F 124 to transmit the converted image data through the network.

At S212, the ASIC 116 determines whether any subsequent processing request is received for the same original document in a substantially similar manner as described above referring to S209. When it is determined that the subsequent processing request is received ("YES" at S209), the operation returns to S210 to repeat S210 to S212. When it is determined that the subsequent processing request is not received ("NO" at S209), the operation proceeds to S213.

At S213, the ASIC 116 deletes the scanned image data and the converted image data that are stored in a memory such as the secondary storage 120, and the operation ends.

Referring to FIG. 3, operation of sequentially converting scanned image data to generate converted image data having different data formats, performed by the converter 130 of the image processing apparatus 110, is explained according to an example embodiment of the present invention. The operation of FIG. 3 is performed by the converter 130 at S206 of FIG. 2.

At S301, the converter 130 obtains the scanned image data from the secondary storage 120 to sequentially generate converted image data having different data formats. In this example, the converter 130 is caused to previously generate converted image data having a data format other than the format of the converted image data that is generated at S204 of FIG. 2, before the subsequent processing request is received.

At S302, the converter 130 stores the converted image data in the secondary storage 120, in association with the image data identification information, and the operation ends. Examples of a data format of the converted image data to be generated by the converter 130 are explained below referring to FIG. 4.

FIG. 4 illustrates example data formats that can be converted to by the converter 130. In FIG. 4, for each of copying, facsimile transmission, and network distribution that can be performed by the image processing apparatus 110, information regarding a data format of scanned image data and information regarding a data format of converted image data are specified. This information illustrated in FIG. 4 may be stored in a memory of the image processing apparatus 110, for example, in the form of table. More specifically, according to the information illustrated in FIG. 4, the converter 130 generates the scanned image data, and converts the scanned image data into converted image data having different data formats.

The scanned image data is generated as 8 bit RGB image data, for copying, facsimile, and distribution. More specifically, in this example, the image processing apparatus 110 generates and stores the scanned image data in a data format that is common to different types of processing.

The converted image data for copying is generated either as 2 bit CMYK image data having a encoding format A, or 2 bit CMYK image data having an encoding format B. The encoding format A or B may be determined based on a machine type of the image processing apparatus 110.

The converted image data for facsimile transmission is generated as 1 bit CMYK image data having a MH encoding format, 1 bit CMYK image data having a MR encoding format, 1 bit CMYK image data having a MMR encoding format, or 1 bit CMYK image data having a JBIG encoding format. The data format for facsimile transmission may be set by default.

The converted image data for distribution is generated as: 1 bit CMYK image data having a non-encoded format; 1 bit CMYK image data having a MH encoding format; 1 bit CMYK image data having a MR encoding format; 1 bit CMYK image data having a MMR encoding format; 1 bit CMYK image data having a JBIG encoding format; 8 bit RGB image data having a non-encoded format; 8 bit RGB image data having a JPEG encoding format; 8 bit RGB image data having a JPEG2000 encoding format; 8 bit RGB image data having a clear light PDF encoding format; or 8 bit RGB image data having a searchable PDF encoding format. The data format for network distribution may be determined based on whether image data is transmitted in color or monochrome, which may be specified by the settings information. In case of color, RGB image data is selected. In case of monochrome, CMYK image data is selected.

In this example, the image data identification information, which is to be stored in the secondary storage 120, may be generated based on combination of the processing type information and information regarding the data format after conversion.

The converter 130 may sequentially generate converted image data having any combination of different data formats illustrated in FIG. 4, in a predetermined order that is determined based on a first process requested by a first processing request.

For example, assuming that the image processing apparatus 110 receives a first processing request for copying, the converter 130 generates converted image data having a data format that is suitable for copying processing, for example, in 2 bit CMYK encoded format, to execute the first process. Second, the converter 130 generates converted image data having a data that is suitable for distribution processing, such as in 8 bit RGB unencoded or encoded format, which may be set by default. Third, the converter 130 generates converted image data having a data format that is suitable for facsimile transmission such as in 1 bit CMYK encoded format, which may be set by default.

In another example, assuming that the image processing apparatus 110 receives a first processing request for distribution, the converter 130 generates converted image data having a data format that is suitable for distribution, for example, in 1 bit RGB encoded or unencoded format, to execute the first process. Second, the converter 130 generates converted image data having a data format that is suitable for copying processing, for example, in 2 bit CMYK encoded format.

Third, the converter 130 generates converted image data having a data format that is suitable for facsimile transmission, for example in 1 bit CMYK encoded format, which may be set by default.

In another example, assuming that the image processing apparatus 110 receives a first processing request for facsimile transmission, the converter 130 generates converted image data having a data format that is suitable for facsimile transmission, for example, in 1 bit CMYK encoded format, to execute the first process. Second, the converter 130 generates converted image data having a data format that is suitable for network distribution, for example, in 8 bit RGB encoded or unencoded format, which may be set by default. Third, the converter 130 generates converted image data having a data format that is suitable for copying processing, for example, in 2 bit CMYK encoded format.

The combination of data formats of converted image data to be generated, or the order of generating the converted image data, is not limited to the above-described examples.

Alternatively, the converter 130 may sequentially generate converted image data having any combination of different data formats illustrated in FIG. 4, in an order determined based on the frequency, i.e., a number of times each processing is requested.

In such case, the ASIC 116 counts a number of requests, or execution, for each type of processing, and stores the counted number in the nonvolatile memory such as the secondary storage 120. The converter 130 refers to the counted number in the memory to generate converted image data in an order determined by the counted number. More specifically, the converter 130 first generates converted image data having a data format that is suitable for the most frequently requested processing.

For example, assuming that the frequencies in user requests, i.e., the counted numbers, are 105, 85, and 28, respectively for copying processing, distribution processing, and facsimile transmission processing, the converter 130 first generates converted image data having a data format that is suitable for copying such as in 2 bit CMYK encoded format. Second, the converter 130 generates converted image data having a data format that is suitable for distribution such as in 1 bit CMYK encoded or unencoded format. Third, the converter 130 generates converted image data having a data format suitable for facsimile transmission such as in 1 bit CMYK encoded format.

Figure 5B:
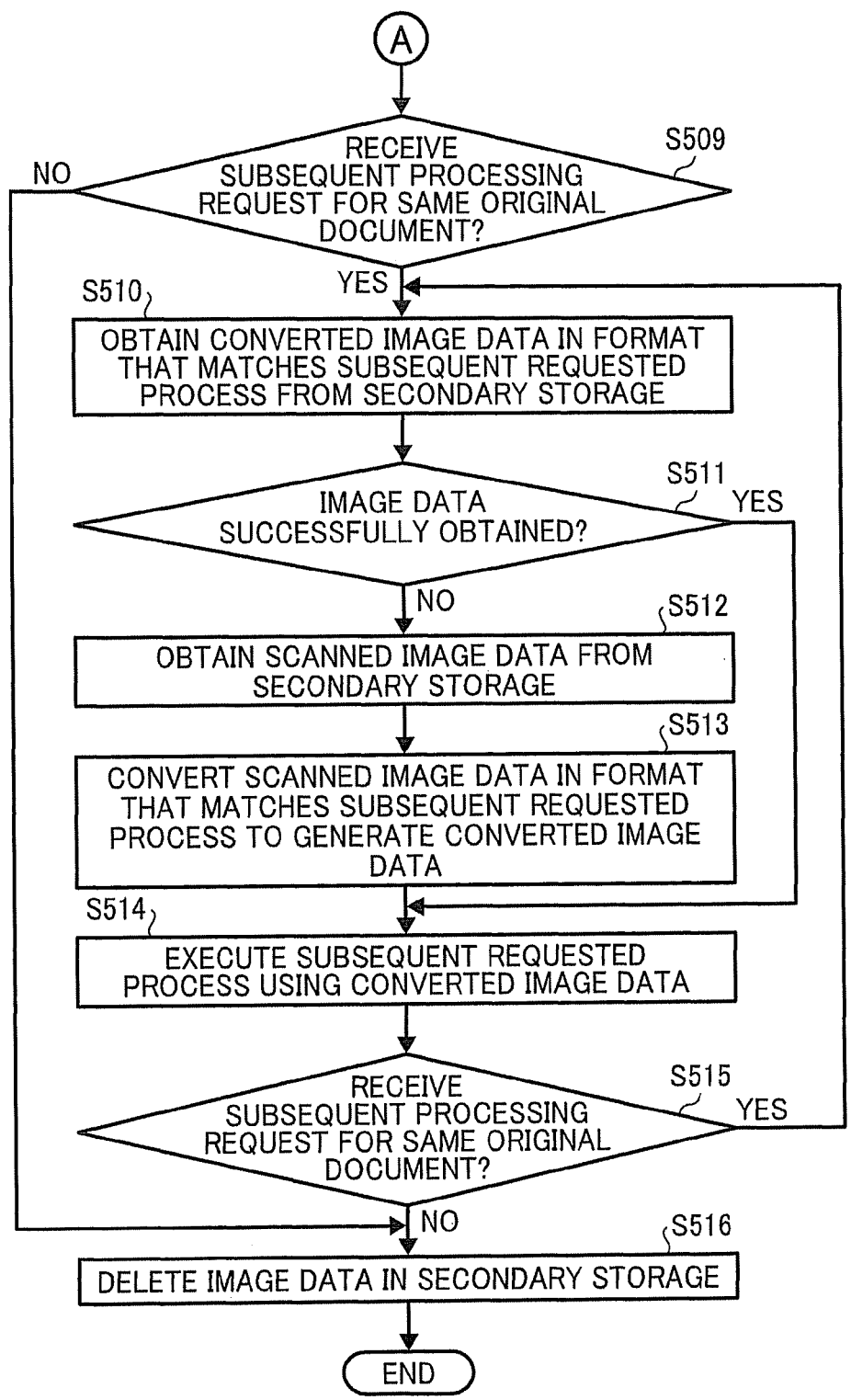

Referring now to FIG. 5, operation of processing a plurality of requests requested by the user with respect to an original document, performed by the image processing apparatus 110, is explained according to an example embodiment of the present invention. S501 to S510 of FIG. 5 are performed in a substantially similar manner as described above referring to S201 to S210 such that explanation thereof is omitted.

At S511, the ASIC 116 determines whether the converted image data having a data format that is suitable for the subsequent processing request obtained at S509 is successfully received. When it is determined that the converted image data is successfully obtained ("YES" at S511), the operation proceeds to S514. When it is determined that the converted image data is not successfully obtained ("NO" at S511), the operation proceeds to S512.

At S512, the ASIC 116 obtains the scanned image data from the secondary storage 120. At S512, the ASIC 116 causes the converter 130 to convert the scanned image data obtained at S512 to have a data format that is suitable for the subsequent process requested by the subsequent processing request to generate converted image data.

In this example, the converter 130 uses the process type information that is received together with the subsequent processing request to specify the subsequent requested process, in a substantially similar manner as described above referring to FIG. 2. The converter 130 further specifies the encoding format requested by the subsequent processing request, based on information regarding the encoding format of image data that is included in the subsequent processing request as the settings information. When the subsequent processing request does not include such information regarding the encoding format, the converter 130 uses a desired encoding format that can be converted to by the converter 130 as the format of the converted image data.

At S514, the ASIC 116 provides the converted image data obtained at S510 or the converted image data that is generated at S513 to a function that is capable of executing the subsequent requested process requested by the subsequent processing request to perform the subsequent requested process. At S515, the ASIC 116 determines whether a subsequent processing request is received for the same original document that has been processed, in a substantially similar manner as described above referring to S509. When it is determined that the subsequent processing request is received ("YES" at S515), the operation returns to S510 to repeat S510 to S515. When it is determined that the subsequent processing request is not received ("NO" at S515), the operation proceeds to S516.

At S516, the ASIC 116 deletes the scanned image data and the converted image data that are stored in the secondary storage 120, and the operation ends. In this example, even when the converted image data stored in the secondary storage 120 is accidentally lost, the subsequent process can be performed using the scanned image data.

Figure 6B:
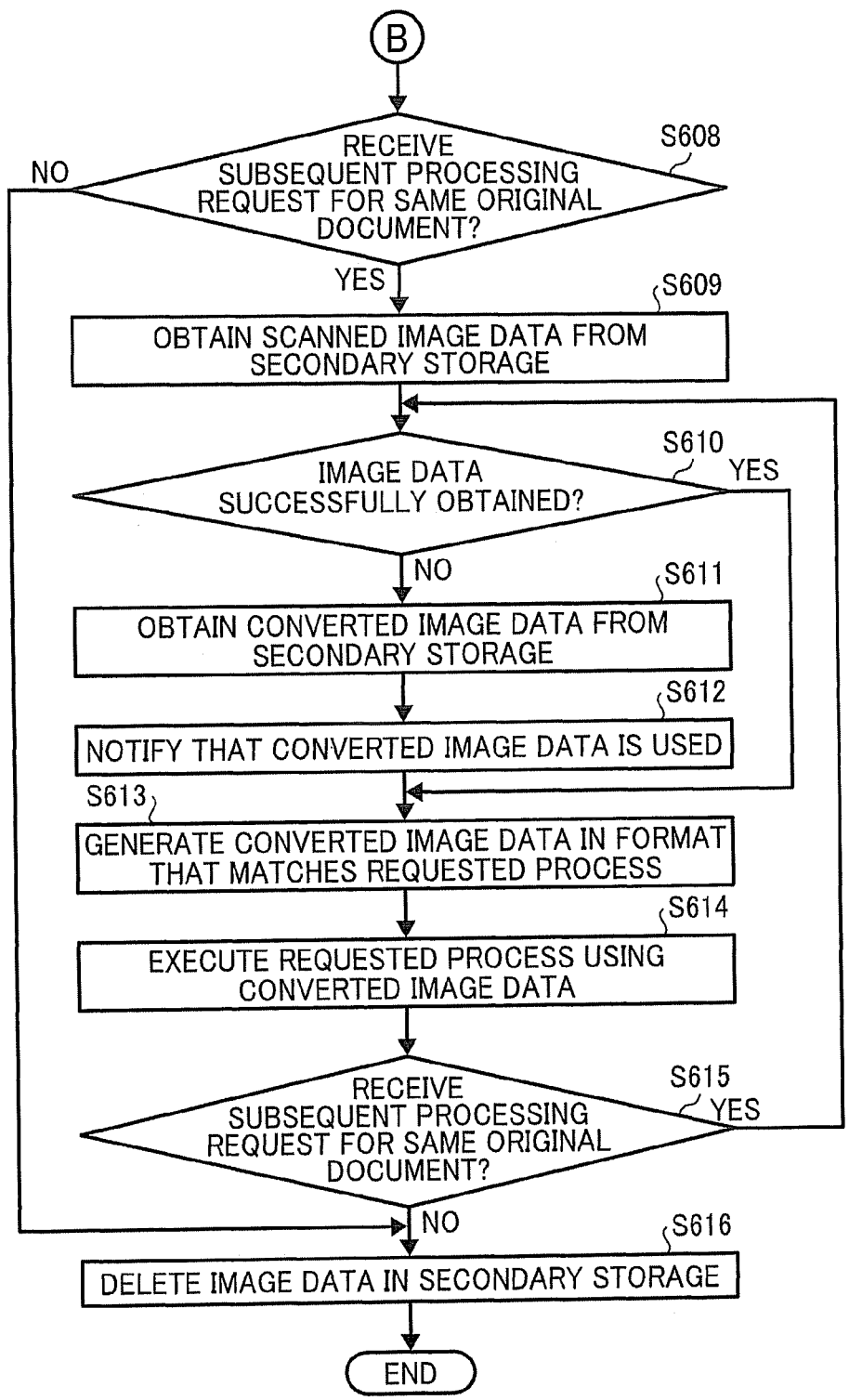

Referring now to FIG. 6, operation of processing a plurality of requests requested by the user with respect to an original document, performed by the image processing apparatus 110 of FIG. 1, is explained according to an example embodiment of the present invention. The operation of FIG. 6 is performed when the power of the image processing apparatus 110 is turned on. Further, in this example, it is assumed that the user at the image processing apparatus 110 places the original document onto a document feeder of an automatic document feeder (ADF) or an exposure glass of the image processing apparatus 110, before inputting an instruction to the image processing apparatus 110.

At S601, the ASIC 116 determines whether a processing request is received from the operation panel 128. When it is determined that the processing request is not received ("NO" at S601), the operation repeats S601. When it is determined that the processing request is received ("YES" at S601), the operation proceeds to S602.

At S602, the ASIC 116 transmits an instruction for scanning the original document to the engine 134. The ASIC 136 of the engine 134 causes the scanner 138 to scan the original document to generate scanned image data, and transmits the scanned image data to the ASIC 116, in a substantially similar manner as described above referring to FIG. 2. At S603, the ASIC 116 stores the scanned image data generated at S602 in the secondary storage 120, through the image data buffer 118.

At S604, the ASIC 116 sends the scanned image data generated at S602 to the converter 130 to cause the converter 130 to convert the scanned image data into converted image data having a format that matches the process requested by the processing request received at S601, in a substantially similar manner as described above referring to S204 of FIG. 2.

At S605, the ASIC 116 stores the converted image data generated by the converter 130 in the secondary storage 120, through the image data buffer 118.

At S606, the ASIC 116 determines whether there is any original document to be scanned, in a substantially similar manner as described above referring to S207 of FIG. 2. When it is determined that there is an original document to be scanned ("YES" at S606), the operation returns to S602 to repeat S602 to S606. When it is determined that there is no original document to be scanned ("NO" at S606), the operation proceeds to S607.

At S607, the ASIC 116 obtains the converted image data from the secondary storage 120, and provides the converted image data to a function that is capable of executing the process requested by the processing request to perform the requested process, in a substantially similar manner as described above referring to S208 of FIG. 2.

At S608, the ASIC 116 determines whether a subsequent processing request is received for the same original document that has been processed at S607. When it is determined that the subsequent processing request is received ("YES" at S608), the operation proceeds to S609. When it is determined that the subsequent processing request is not received ("NO" at S608), the operation proceeds to S616.

At S609, the ASIC 116 obtains the scanned image data stored in the secondary storage 120. At S610, the ASIC 116 determines whether the scanned image data is successfully obtained. When it is determined that the scanned image data is successfully obtained ("YES" at S610), the operation proceeds to S613. When it is determined that the scanned image data is not successfully obtained ("NO" at S610), the operation proceeds to S611.

At S611, the ASIC 116 obtains the converted image data, which is generated at S604 for the first process, from the secondary storage 120. At S612, the ASIC 116 causes the operation panel 128 to display a message indicating that the converted image data is used due to an error in obtaining the scanned image data.

At S613, the ASIC 116 causes the converter 130 to convert the scanned image data successfully obtained at S609 or the converted image data obtained at S611 in alternative to the scanned image data, into converted image data having a data format that matches the subsequent requested process.

At S614, the ASIC 116 provides the converted image data generated at S613 to a function that executes the requested process requested by the subsequent processing request to cause the function to execute the requested process onto the converted image data.

At S615, the ASIC 116 determines whether any subsequent processing request is received for the same original document in a substantially similar manner as described above referring to S608. When it is determined that the subsequent processing request is received ("YES" at S615), the operation returns to S610 to repeat S610 to S615. When it is determined that the subsequent processing request is not received ("NO" at S615), the operation proceeds to S616.

At S616, the ASIC 616 deletes the scanned image data and the converted image data that are stored in the secondary storage 120, and the operation ends. In this example, even when the scanned image data is accidentally lost from the secondary storage 120, the subsequent process can be performed using the converted image data.

The above-described operation may be performed in various other ways. For example, at S611, the image processing apparatus 110 may display a message indicating that the scanned image data is not obtained, and asks the user whether to continue processing by using the converted image data or cancel the current processing.

As described above, the image processing apparatus scans an original document into scanned image data, and converts the scanned image data into converted image data having a data format that is suitable for a first process requested by a first processing request. In prior to receiving a subsequent processing request that follows the first processing request, the image processing apparatus generates converted image data from the scanned image data, which has a data format other than the data format of the converted image data generated for the first process, and stores the converted image data in a storage device. After the first process is executed, the image processing apparatus obtains the converted image data having a data format that is suitable for a subsequent process requested by a subsequent processing request, from the storage device, to perform the subsequent process. Since the converted image data having a data format suitable for the subsequent process has been prepared at the time of executing the subsequent processing request, the subsequent process can be effectively performed with reduced processing time.

In case the converted image data having a data format that is suitable for the subsequent requested process requested by the subsequent processing request is not successfully obtained, the image processing apparatus generates converted image data having a data format suitable for the subsequent process using the scanned image data stored in the storage device. With this structure, the subsequent processing request is effectively processed even when the converted image data that has been prepared for the subsequent process is accidentally lost.

In generating the converted image data for subsequent processes to be generated, the image processing apparatus may be programmed to generate converted image data having a data format that is suitable for a process that is most frequently requested by the user.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in: an image processing apparatus for processing image data. The image processing includes: means for receiving a plurality of processing requests from a user; means for scanning an original document into scanned image data; means for converting a format of the scanned image data to generate converted image data; means for storing the scanned image data and the converted image data in a storage device; and means for executing a process requested by the processing request using the converted image data. The means for converting generates first converted image data having a data format that is suitable for a process requested by a first processing request, and converted image data having a data format other than the data format of the first converted image data, in prior to receiving a subsequent processing request. When the subsequent processing request is received after completion of the process requested by the first processing request, the means for executing obtains converted image data having a data format that is suitable for a subsequent process requested by the subsequent processing request from the storage device and executes the subsequent process using the obtained converted image data.

In the above-described image processing apparatus, when the means for executing does not obtain the converted image data having a data format that matches the subsequent process requested by the subsequent processing request, the means for converting obtains the scanned image data from the storage device and newly generates converted image data having a data format that matches the subsequent process, and the means for executing executes the subsequent process using the converted image data that is newly generated.

In the above-described image processing apparatus, in one example, the means for converting generates a plurality of items of the converted image data having the data format other than the data format of the first converted image data, in an order determined by frequency in processing requests, such that the data format that corresponds to a processing request that is most frequently requested is firstly processed.

In the above-described image processing apparatus, in one example, the means for converting generates a plurality of items of the converted image data having the data format other than the data format of the first converted image data in an order previously determined.

In another example, the present invention may reside in an image processing apparatus for processing image data, which includes: means for receiving a plurality of processing requests from a user; means for scanning an original document into scanned image data; means for converting a format of the scanned image data to generate converted image data; means for storing the scanned image data and the converted image data in a storage device; and means for executing a process requested by the processing request using the converted image data. After the means for executing executes a process requested by a first processing request, the means for converting obtains the scanned image data from the storage device and generates converted image data having a data format that matches a process requested by a subsequent processing request. The means for executing executes a subsequent process requested by the subsequent processing request, using the converted image data.

In the above-described example, in one example, when the scanned image data is not obtained from the storage device, the means for converting obtains the converted image data from the storage, and converts the obtained converted image data to have a data format that matches a subsequent process requested by the subsequent processing request.

In the above-described image processing apparatus, in one example, the image processing apparatus further includes means for notifying the user of information indicating that the scanned image data is not obtained from the storage.

In the above-described image processing apparatus, in one example, the means for executing executes the subsequent process only when the means for receiving receives an instruction for storing the image data.

In the above-described image processing apparatus, in one example, the process requested by the processing request includes at least one of: a process of copying the original document; a process of transmitting image data via facsimile; and a process of distributing image data through a network.

In one example, the present invention may reside in an image processing method performed by an image processing apparatus, which includes: receiving a plurality of processing requests from a user; scanning an original document into scanned image data; converting a format of the scanned image data to generate converted image data; storing the scanned image data and the converted image data in a storage device; and executing a process requested by the processing request using the converted image data. The converting generates first converted image data having a data format that matches a process requested by a first processing request, and converted image data having a data format other than the data format of the first converted image data, in prior to receiving a subsequent processing request. When the subsequent processing request is received after completion of the process requested by the first processing request, the executing obtains the converted image data having a data format that matches a subsequent process requested by the subsequent processing request from the storage device and executes the subsequent process using the converted image data.

In the above-described image processing method, when the executing does not obtain the converted image data having a data format that matches the subsequent process requested by the subsequent processing request, the method further includes: obtaining the scanned image data from the storage device to newly generate converted image data having a data format that matches the subsequent process; and executing the subsequent process using the converted image data that is newly generated.

In the above-described image processing method, the converting generates a plurality of items of the converted image data having the data format other than the data format of the first converted image data, in an order determined by frequency in processing requests, such that the data format that corresponds to a processing request that is most frequently requested is firstly processed.

In one example, the present invention may reside in a non-transitory recording medium storing a plurality of instructions which, when executed by a processor, cause the processor to perform any one of the above-described image processing methods.

In one example, the present invention may reside in: an image processing method performed by an image processing apparatus, the method including: receiving a first processing request that requests the image processing apparatus to perform a first process with respect to an original document; scanning the original document into scanned image data having a predetermined data format; converting the predetermined data format of the scanned image data to a data format that is suitable for the first process requested by the first processing request to generate converted image data; storing the scanned image data and the converted image data in a memory; executing the first process requested by the first processing request, using the converted image data having the data format that is suitable for the first process; determining whether a subsequent processing request that requests the image processing apparatus to perform a subsequent process that follows the first processing request is received with respect to the same original document; obtaining one of the scanned image data and the converted image data from the memory, the converted image data being obtained when the scanned image data is not successfully obtained from the memory; converting the predetermined data format of the one of the scanned image data and the converted image data to a data format that is suitable for the subsequent process requested by the subsequent processing request to generate converted image data having the data format that is suitable for the subsequent process; and executing the subsequent process requested by the subsequent processing request, using the converted image data having the data format that is suitable for the subsequent process.

In the above-described image processing method, in on example, the method further includes: notifying the user of information indicating that the scanned image data is not available, when the scanned image data is not successfully obtained from the memory.

What is claimed is:

1. An image processing apparatus, comprising:
a user interface to receive a first processing request that requests the image processing apparatus to perform a first process with respect to an original document;
a scanner device to scan the original document into scanned image data having a predetermined data format;
a storage device to store the scanned image data;
a converter to convert the predetermined data format of the scanned image data to a plurality of types of data formats of converted image data and to store the converted image data in the storage device, the plurality of types of data formats including: (1) a data format that is suitable for the first process requested by the first processing request; and (2) at least one data format that is suitable for a process other than the first process requested by the first processing request; and
a processor to:
execute the first process requested by the first processing request, using the converted image data having the data format that is suitable for the first process;
determine whether a subsequent processing request that requests the image processing apparatus to perform a subsequent process that follows the first processing request is received with respect to the same original document through the user interface;
obtain converted image data having a data format that is suitable for the subsequent process requested by the subsequent processing request from the storage device; and
execute the subsequent process requested by the subsequent processing request, using the converted image data having the data format that is suitable for the subsequent process.

2. The image processing apparatus of claim 1, wherein the processor is further configured to:
determine whether the converted image data having the data format that is suitable for the subsequent process is successfully obtained from the storage device to generate a determination result, and
when the determination result indicates that the converted image data having the data format that is suitable for the subsequent process is not successfully obtained, the processor obtains the scanned image data from the storage device, and causes the converter to convert the scanned image data to newly generate the converted image data having the data format that is suitable for the subsequent process.

3. The image processing apparatus of claim 1, wherein the processor is further configured to:
count, for each type of processing requests to be processed by the image processing apparatus, a number of processing requests that are previously received by the user interface to each perform a process requested by each type of processing requests; and
determine an order of generating the converted image data having the plurality of types of data formats based on the counted number of requests such that the converted image data having a data format that is suitable for a process that is most frequently requested is firstly generated.

4. The image processing apparatus of claim 1, wherein the processor is further configured to:
determine an order of generating the converted image data having the plurality of types of data formats based on a type of the first process requested by the first processing request.

5. The image processing apparatus of claim 1, wherein, when the user interface receives a user instruction for storing image data being processed,
the processor further waits for a predetermined time period after the first process requested by the first processing request is executed, and generates the determination result indicating that the subsequent processing request is not received when no subsequent processing request is received for the predetermined time period.

6. The image processing apparatus of claim 1, wherein the process requested by the processing request includes at least one of:
a process of copying the original document onto a recording sheet;
a process of transmitting image data of the original document via facsimile; and
a process of distributing image data of the original document through a network.

7. The image processing apparatus of claim 1, wherein the processor assigns image data identification information to the converted image data being stored in the storage device, based on information regarding a type of process that the data format of the converted image is suitable for, and an encoding format of the converted image data.

8. An image processing apparatus, comprising:
a user interface to receive a first processing request that requests the image processing apparatus to perform a first process with respect to an original document;
a scanner device to scan the original document into scanned image data having a predetermined data format;
a converter to convert the predetermined data format of the scanned image data to a data format that is suitable for the first process requested by the first processing request to generate converted image data;
a storage device to store the scanned image data and the converted image data; and
a processor configured to:
execute the first process requested by the first processing request, using the converted image data having the data format that is suitable for the first process;
determine whether a subsequent processing request that requests the image processing apparatus to perform a subsequent process that follows the first processing request is received with respect to the same original document;
obtain one of the scanned image data and the converted image data from the storage device, the converted image data being obtained when the scanned image data is not successfully obtained from the storage device;
convert, using the converter, the predetermined data format of the one of the scanned image data and the converted image data to a data format that is suitable for the subsequent process requested by the subsequent processing request to generate converted image data having the data format that is suitable for the subsequent process; and
execute the subsequent process requested by the subsequent processing request, using the converted image data having the data format that is suitable for the subsequent process.

9. The image processing apparatus of claim 8, wherein the processor is further configured to
send notification, through the user interface, notifying the user of information indicating that the scanned image data is not available, when the scanned image data is not successfully obtained from the storage device.

10. The image processing apparatus of claim 8, wherein, when the user interface receives a user instruction for storing image data being processed,
the processor further waits for a predetermined time period after the first process requested by the first processing request is executed, and generates the determination result indicating that the subsequent processing request is not received when no subsequent processing request is received for the predetermined time period.

11. The image processing apparatus of claim 8, wherein the process requested by the processing request includes at least one of:
a process of copying the original document onto a recording sheet;
a process of transmitting image data of the original document via facsimile; and
a process of distributing image data of the original document through a network.

12. An image processing method performed by an image processing apparatus, the method comprising:
receiving a first processing request that requests the image processing apparatus to perform a first process with respect to an original document;
scanning the original document into scanned image data having a predetermined data format;
storing the scanned image data in a memory;
converting the predetermined data format of the scanned image data to a plurality of types of data formats of converted image data, the plurality of types of data formats including: (1) a data format that is suitable for the first process requested by the first processing request; and (2) at least one data format that is suitable for a process other than the first process requested by the first processing request;
storing the converted image data in the memory;
executing the first process requested by the first processing request, using the converted image data having the data format that is suitable for the first process;
determining whether a subsequent processing request that requests the image processing apparatus to perform a subsequent process that follows the first processing request is received with respect to the same original document;

obtaining the converted image data having a data format that is suitable for the subsequent process requested by the subsequent processing request from the memory; and executing the subsequent process requested by the subsequent processing request, using the converted image data having the data format that is suitable for the subsequent process.

13. The image processing method of claim 12, further comprising:

determining whether the converted image data having the data format that is suitable for the subsequent process is successfully obtained from the memory to generate a determination result, and when the determination result indicates that the converted image data having the data format that is suitable for the subsequent process is not successfully obtained, the method further comprising:

obtaining the scanned image data from the memory; and converting the scanned image data to newly generate the converted image data having the data format that is suitable for the subsequent process.

14. The image processing method of claim 12, further comprising:

counting, for each type of processing requests to be processed by the image processing apparatus, a number of processing requests that are previously received by the image processing apparatus to each perform a process requested by each type of processing requests; and determining an order of generating the converted image data having the plurality of types of data formats based on the counted number of requests such that the converted image data having a data format that is suitable for a process that is most frequently requested is firstly generated.

15. The image processing method of claim 12, further comprising:

determining an order of generating the converted image data having the plurality of types of data formats based on a type of the first process requested by the first processing request.

* * * * *